R. W. SMALLEY.
Whiffletree Attachment.

No. 202,199.  Patented April 9, 1878.

WITNESSES  INVENTOR
John E. Trumning  Rolan W. Smalley
B. W. Williams
By his Attys.
Henry W. Williams &co

UNITED STATES PATENT OFFICE.

ROLAN W. SMALLEY, OF SALEM, MASSACHUSETTS.

IMPROVEMENT IN WHIFFLETREE ATTACHMENTS.

Specification forming part of Letters Patent No. 202,199, dated April 9, 1878; application filed January 22, 1878.

*To all whom it may concern:*

Be it known that I, ROLAN W. SMALLEY, of Salem, in the county of Essex and State of Massachusetts, have invented a new and useful Improvement in Whiffletree Attachments, which improvement is fully set forth and described in the following specification and accompanying drawings, in which—

Figure 1:
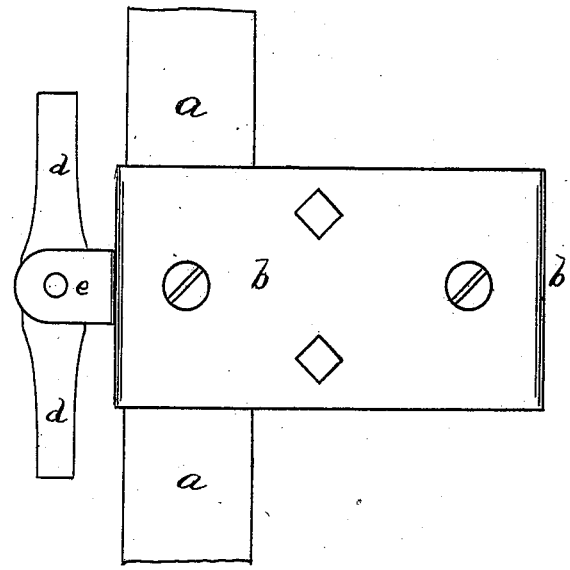
Figure 2:
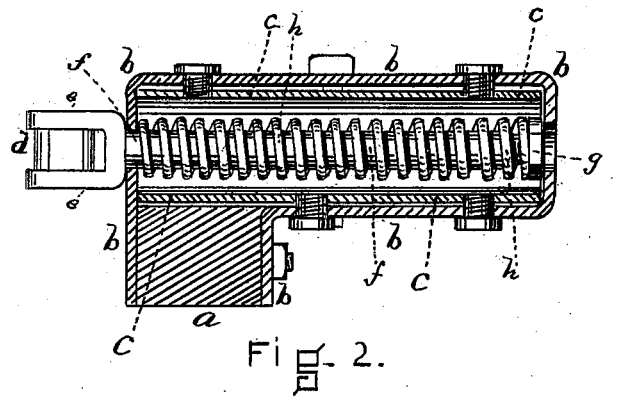

Figure 1 is a plan view of a whiffletree attachment embodying my invention. Fig. 2 is a longitudinal vertical section of the same.

Similar letters of reference indicate corresponding parts.

The object of my improvement is to provide a cheap and durable attachment to the whiffletree of a carriage or other vehicle, which will ease the strain upon the whiffletree, and also upon the horse, when the carriage is being started or is encountering obstacles in the road.

The yielding caused by my invention as the load is started will often prevent the breakage of harness, and will save the horse from the sudden arbitrary jar and jolt upon his breast when drawing a load over rough and uneven roads.

In carrying out my invention, I attach a metallic strap or box to the cross-piece at the rear ends of the shafts, the said box or strap extending back from the cross-piece, and containing a tube extending longitudinally within it. A rod extends from the whiffletree to and throughout the length of the tube, and terminates in a nut. A spiral spring lies around the rod between the nut and the front wall of the strap or box, and receives the strain incident to the first pull in starting a team.

$a$ represents the cross-piece at the rear end of the shaft. Securely attached to the front and back side of the said cross-piece is the metallic box or strap $b$, extending back toward or under the carriage, and substantially of the shape shown in the drawing. $c$ is a metallic tube placed longitudinally within the box or strap $b$. $d$ is the whiffletree. $e$ is a clasp, holding the whiffletree, and connected with the rod $f$, which extends the length of the box $b$ and terminates in a nut, $g$. The spiral spring $h$ lies between the nut $g$ and the front wall of the box $b$, and encircles the rod $f$. Thus it will be seen that when the power of the horse is applied to the whiffletree $d$ the spring $h$ acts as a cushion and receives the first brunt of the strain, with the beneficial results above mentioned.

I am aware that the use of a spiral spring in connection with vehicles for the purpose of easing the horse when starting the load is not new; and I am also aware of the existence of a patent dated March 7, 1876, which applies a spring to the draw-bars of cars. I therefore do not claim, broadly, the application of a spring to a whiffletree.

What I claim, and desire to secure by Letters Patent, is—

The herein-described improved whiffletree attachment, consisting of the open strap or box $b$, securely attached to the cross-piece $a$, in combination with the tube $c$, fixed in said box $b$, rod $f$, nut $g$, spring $h$, and clasp $e$, all combined, constructed, and arranged substantially as above set forth.

ROLAN W. SMALLEY.

Witnesses:
W. A. PERRY,
J. A. HOOK.